INVENTOR.
HAROLD C. PORTER
BY Wade Koontz Jr
Ruth G. Codier
ATTORNEYS

INVENTOR.
HAROLD C. PORTER
BY Wade Koontz
Ruth G. Codier
ATTORNEYS 3,317,680
Patented May 2, 1967

3,317,680

DEVICE FOR REPETITIVELY SCANNING SELECTED SMALL INCREMENTS OF DATA

Harold C. Porter, Pepperell, Mass., assignor to the United States of America as represented by the Secretary of the Air Force Filed Apr. 10, 1963, Ser. No. 272,169
4 Claims. (Cl. 179—100.2)

The invention described herein may be manufactured and used by or for the United States Government for governmental purposes without payment to me of any royalty thereon.

The invention relates to a magnetic tape scanning and analysis device and more particularly relates to a device for repetitively reading, recording, or erasing selected small increments of data contained on large reels of magnetic tape.

By means of the present invention an operator is enabled to select very small sections of recorded data on any standard large reel of magnetic tape, observe an oscillograph reproduction, or listen to the part selected, repetitively reproduced while a study or analysis of the signal content or intelligence on the segment is being analyzed. It is possible to compare this intelligence or segment content with a second increment recorded on an adjacent track of the magnetic tape, erase the increment under observation without disturbing the remainder of the recorded data, and record new data where the erasure was made.

The device is also capable of scanning the entire reel of tape in the usual manner, until the desired segment is reached.

The device also incorporates means for triggering an oscilloscope or other recording or reproducing device repetitively, each time the segment is scanned. This triggering means is capable of being advanced or delayed by the operator in relation to the segment of data being observed.

The object of the invention is therefore to provide a device which will accomplish all of the purposes above noted.

A further object of the invention is the provision of a pressure mechanism incorporated into the above noted device which holds the tape in contact with the scanning drum, and is so designed that the length of tape in contact with the scanning drum can be varied, thus changing the length of tape or segment under observation. By this means, very small bits of information may be recorded or erased at discreet points on a tape.

The device is so constructed that the velocity of tape travel can be easily changed to any desired speed without affecting its operation.

While the device as constructed, uses two adjacent tracks, there is no technical or practical reason why any number of tracks which can be recorded on a magnetic tape cannot be used in this device.

One of the specific applications is to record the same signal on both tracks, then, while observing a small selected segment, erase the signal from this bit of one track and record another signal, to be compared with the original signal still remaining on the adjacent track.

These and other objects of the invention will appear as the description proceeds.

In the drawing.

Referring more in detail to the drawings wherein like numerals designate like parts on the several figures.

Figure 1:
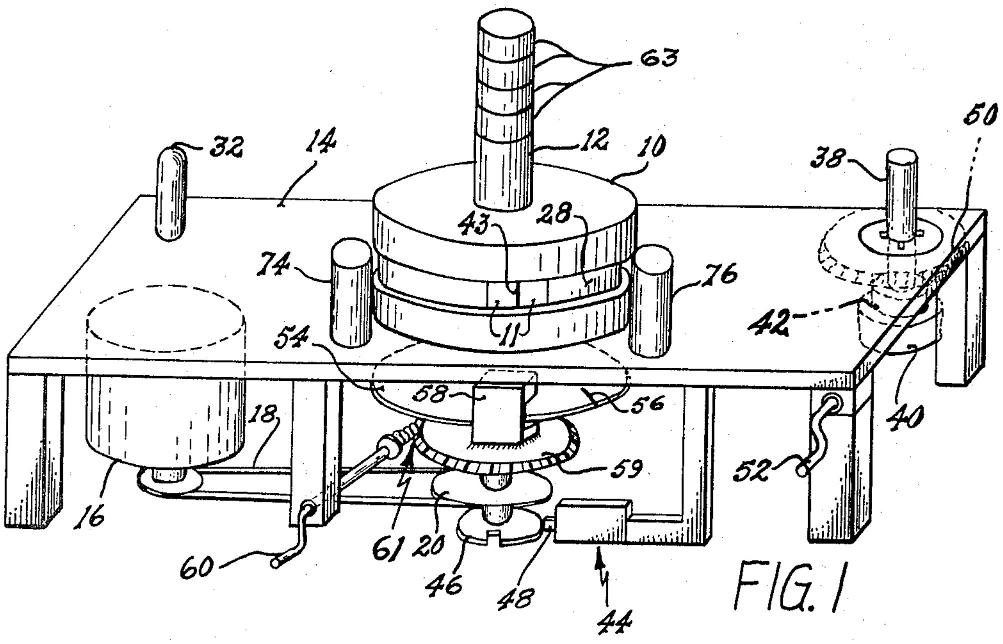
FIGURE 1 is a perspective view of the magnetic tape scanning and analysis device.
Figure 2:
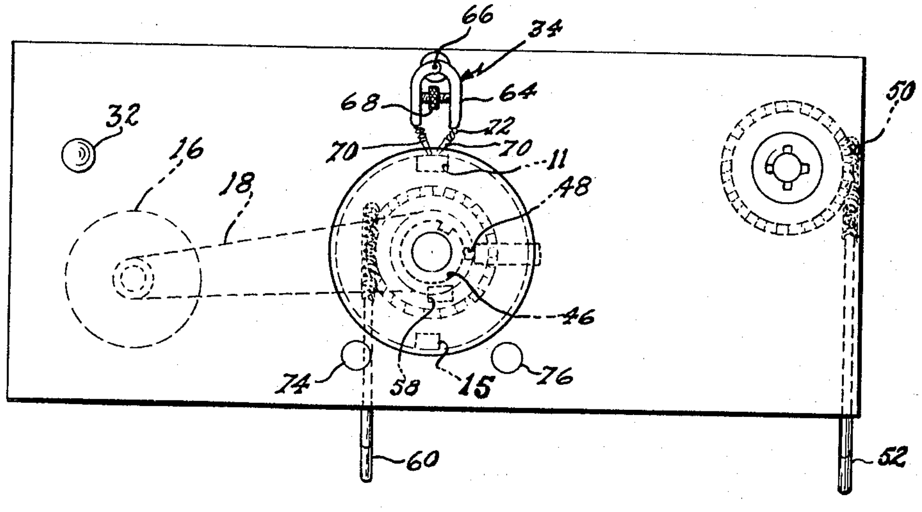
FIGURE 2 is a top view of the device illustrated in FIGURE 1.
Figure 3:
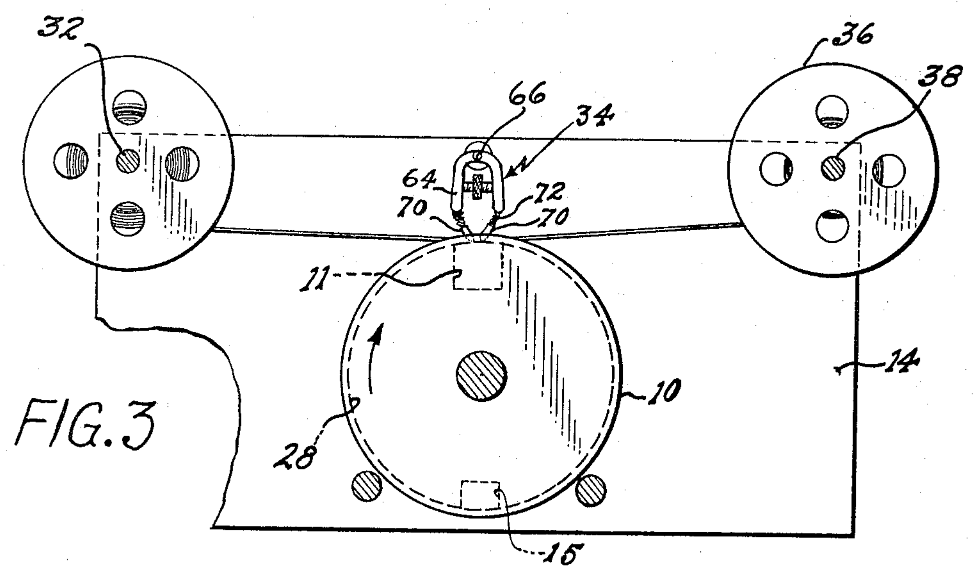
FIGURE 3 is a top view showing one method of threading the tape for examination of a small segment.

A drum 10, which contains a multi-track record/playback head 11, (shown in dotted lines on FIGURES 2, 3 and 4), is mounted on a shaft 12 for rotation therewith with respect to a table or other suitable support 14. The drum 10 is mechanically coupled to the table mounted motor 16 by any expedient means such as belt 18 and friction wheel 20 or alternatively, a gear system (not shown) to operate the drum 10 at the desired speed. This speed may be equivalent to the speed of the original tape when recorded, or a slower or faster rate for accommodation to the instrumentation to be used. The drum 10 also houses an erase head 15.

The drum 10 is provided with a tape groove 28. The multi-track record/playback head 11 fits into an opening in the floor of the groove 28 and is so arranged as to provide an uninterrupted circumferential surface therewith.

A standard reel of tape 30 is placed on the supply spindle 32, is fed between the groove 28 of the drum 10 and the pressure pad device 34 (later described) and onto the takeup reel 36. The tape takeup reel is keyed to the takeup spindle 38 for rotation therewith. The takeup spindle 38 is driven by a separate motor 40 through a slip clutch device shown at 42 in a conventional manner.

In the present showing, the speed of the motor 40 is variable, being controlled by the operator, and constitutes the only method of "fast scan" operation. However, where more accurate speed must be maintained an auxiliary capstan (not shown) can be driven from the motor 40 at the desired constant speed, in a standard manner.

The motor 40 operates the takeup spindle 38 to lead the moving tape past the playback head 11. When the tape is moving, the drum 10 is held stationary, the tape moving past gap 43 in the playback head 11. The gap 43 which is the gap between pole pieces in a standard playback head, is positioned to receive the intelligence magnetically recorded on the tape. The pressure device 34 is positioned to provide pressure in this area.

For scanning of the entire tape, or for finding a segment in the tape which is to be examined, the drum 10 is held stationary by a solenoid type latch 44 consisting of a notched disk 46 and detent 48. This latch is operated automatically to engage detent 48 in the disk 46 to hold the drum 10 against rotation. The conventional source of energy for the motor 40 is also applied to the solenoid operating the latch 44. Thus, whenever the takeup motor 40 is in operation, the latch will be in engagement and the drum will be held against rotation, and in the proper position for playback operation with the playback head 11 adjacent to the pressure unit 34.

Manual operation to position the tape is also made possible by the gear train 50 and hand operated crank 52.

The impulse caused in the playback head by the intelligence carried on the tape can be amplified to produce sound, or reproduced as a waveform on an oscilloscope or other desired instrumentation.

A device is provided for triggering the oscilloscope or other instrumentation once for every revolution of the drum, or conceivably other ratios may be contrived. A disk 54 is mounted on the shaft 12 to rotate with it. A very narrow optical slit 56 is provided in the disk 54. The disk 54 intercepts a beam of light focused on a photosensitive cell, the light and the cell being contained in the photosensitive cell unit 58. As the disk 54 turns, the light beam on one side of disk 54 sensitizes the photosensitive cell on the other side of the disk through the slit 56. The pulse so derived is used to trigger an oscilloscope or other devices associated with the equipment. The photosensitive cell unit 58 is mounted on a disk 59, which is free to rotate with respect to the shaft 12. The operator may manually move the photosensitive cell unit position circumferentially with relation to the slit 56. The crank 60 and gear unit 61 are shown for this function. It is to be understood however that any expedient means may be used. The time or space interval between the triggering of the oscilloscope and the actual scanning of the segment of the tape under observation may thus be varied.

On the working model it was found advantageous to mount miniature preamplifiers (not shown) within or upon the drum 10, one for each track, to amplify low level signals before they are passed through the sliprings 63. It will now be apparent that, when the latch 44 is disengaged, the shaft 12 and drum mounted thereon are free to be rotated by the motor 16. The tape remains stationary. The drum 10 rotates, thus passing the slit 43 repetitively by the segment on the tape which has been selected for analysis. The purpose of these preamplifiers is to amplify the small signal present on the tape prior to its transmittal through the slip rings, thus improving the signal-to-noise ratio between the desired signal and the inherent slip ring noise. An erase head 15 makes it possible to compare intelligence on related segments of adjacent sound tracks, erase an increment on one track, replace it with other data, and compare with the related segment on the other track, all of this being done without disturbing the portions of either track which are not immediately involved. An important feature of the invention is the unique pressure device 34 which ensures even contact of the tape against the pickup head, and allows variation of the length of a small tape segment to be repetitively examined.

Figure 5:
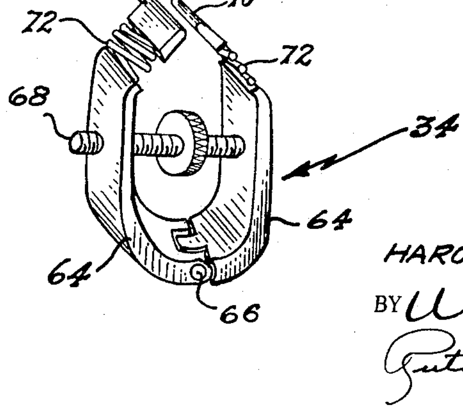
FIGURE 5 is an enlarged detail view of the pressure device.

The pressure assembly 34 (FIGURE 5) is mounted on the support 14 to make contact with the tape across its width. It consists of caliper arms 64 pivotally connected at 66, and adjustable with respect to each other by screw or other means 68 so that the two pressure areas 70 may mark off a varying length of tape segment to be scanned. The arms 64 are provided with pressure tips 70 which may be made of felt or other like material and are of sufficient width to make contact throughout the width of the tape. Springs 72 provide firm resilient pressure.

Figure 4:
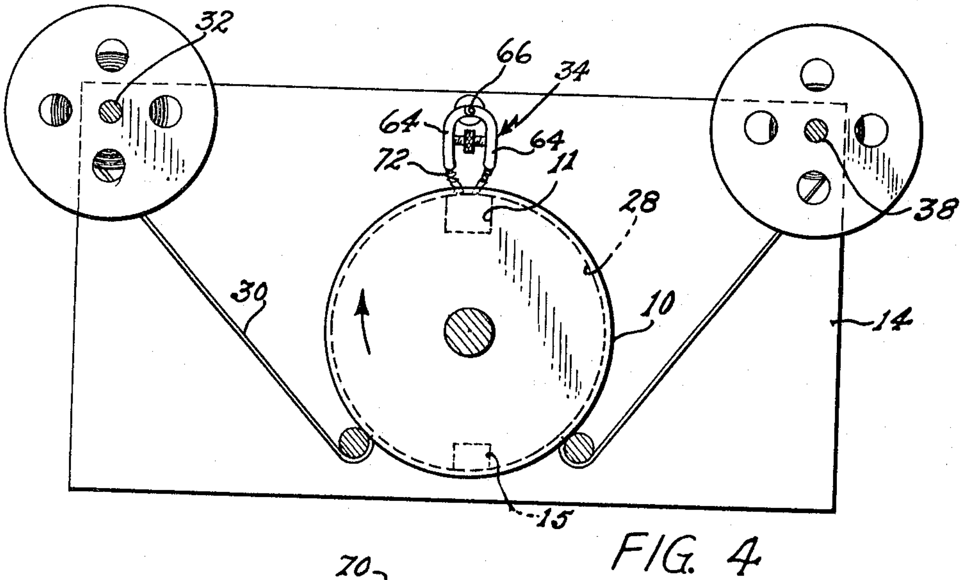
FIGURE 4 is a top view showing another method for threading the device where examination or analysis of a larger section is desired.

When it is desired to scan repetitively larger segments of the tape, the tape may be threaded as shown in FIGURE 4. As large a segment may be scanned as three-quarters of the circumference of the drum. Such a segment is shown in FIGURE 4 between the points X and Y. For this purpose two posts 74 and 76 are provided, so positioned that, in passing between the supply and takeup spools, the tape is brought in contact with the drum along the greater portion of its circumference.

Although the invention has been described with reference to a particular embodiment, it will be understood to those skilled in the art that the invention is capable of a variety of alternative embodiments within the spirit and scope of the appended claims. For example, for a particular application, the solenoid latch 44 might be rendered inoperative where simultaneous rotation of spindle 38 and drum 10 is desired.

I claim:

1. A device for repetitively recording, examining and erasing selected small variable size increments of data, comprising an axis shaft, a drum mounted on said shaft for rotation therewith, a record/playback and erasing devices carried in said drum for receiving intelligence from a magnetically imprinted tape, motor means for rotating said shaft, a supply spindle for supplying said tape, a takeup spindle, motor means for driving said takeup spindle, manual means for driving said takeup spindle, latch means operable to hold said drum and shaft against rotation when said takeup spindle is being driven to move a tape past said record/playback device, tape guide posts so located adjacent said drum as to maintain a maximum of tape length against said drum whereby a tape may be played back in its entirety and also selected segments of tape of a length approximating two thirds of the circumference of the drum may be repetitively examined, a pressure device for pressing said tape resiliently against said record/playback head, said pressure device comprising a pair of pressure elements, a pressure area on each of said elements individually spring loaded to resiliently force said tape against said record/playback head at two spaced areas and means for varying the distance between said elements for varying the length of the segment under examination.

2. A device for repetitively recording, examining, erasing and replacing as desired selected small variable size increments of data, said device comprising an axis shaft, a drum mounted on said shaft, a record/playback head and an erase head carried in said drum, for recording intelligence on a magnetic tape, examining, erasing and replacing said intelligence as desired, motor means for rotating said shaft, a supply spindle, a takeup spindle, motor means for driving said takeup spindle, manual means for driving said spindle, latch means, operable by said spindle drive means to hold said drum and shaft against rotation when said takeup spindle is being driven, a pressure device for pressing said tape resiliently against said record/playback head and varying the segment length under examination, said device comprising a pair of caliper arms pivotally mounted in a position normal with respect to the surface of said tape, pressure pads on the ends of each of said arms spring loaded, for forcing said tape against said playback head at spaced positions, and means for varying the distance between said pressure pads for varying the length of tape segment being scanned.

3. In a scanning and analysis device for repetitively scanning a variable length segment on a magnetic tape, means for holding said tape immovable, a record/playback head mounted on a rotating disc to move repetitively past said variable length segment, a pressure device for providing resilient force for holding said tape aaginst said record/playback head, said device comprising a pair of pivoted caliper arms normally mounted with respect to the surface of said tape, a pressure area on each of said arms individually spring loaded to resiliently force said tape against said record/playback head at two spaced areas and means for varying the distance between said areas for varying the length of tape segment to be repetitively scanned.

4. In a scanning and analysis device for repetitively scanning a variable length segment on a roll of tape having intelligence recorded thereon, means for holding said tape immovable, means for defining the length of a segment of tape to be repetitively scanned, means for passing a record head repetitively past said selected segment, said first named means comprising a pair of caliper arms normally mounted with respect to said tape, a pressure pad individually spring loaded on each of said arms for providing resilient pressure across the transverse width of said tape, and means for varying the distance between said pressure pads for varying the length of tape repetitively scanned.

References Cited by the Examiner

UNITED STATES PATENTS

| | | | |
|---|---|---|---|
| 2,540,406 | 2/1951 | Ranger | 179—100.2 |
| 2,832,840 | 4/1958 | Morin | 179—100.2 |
| 2,941,036 | 6/1960 | Honolka | 179—100.2 X |
| 3,031,525 | 4/1962 | Oniki | 179—100.2 |
| 3,075,049 | 1/1963 | Gordon et al. | 179—100.2 |
| 3,213,193 | 10/1965 | Konishi | 179—100.2 |
| 3,243,798 | 3/1966 | Senders | 179—100.2 X |

BERNARD KONICK, *Primary Examiner.*

JAMES W. MOFFITT, *Examiner.*

L. G. KURLAND, *Assistant Examiner.*